US012594878B2

(12) United States Patent 
Yamamoto et al.

(10) Patent No.: US 12,594,878 B2 
(45) Date of Patent: Apr. 7, 2026

(54) TURN SIGNAL SWITCH DEVICE

(71) Applicant: TOYO DENSO KABUSHIKI KAISHA, Tokyo (JP)

(72) Inventors: Kazuyoshi Yamamoto, Tsurugashima (JP); Kazuki Nagata, Tsurugashima (JP)

(73) Assignee: TOYO DENSO KABUSHIKI KAISHA, Tokyo (JP)

( * ) Notice: Subject to any disclaimer, the term of this patent is extended or adjusted under 35 U.S.C. 154(b) by 439 days.

(21) Appl. No.: 18/126,837

(22) Filed: Mar. 27, 2023

(65) Prior Publication Data 
US 2023/0311748 A1 Oct. 5, 2023

(30) Foreign Application Priority Data 
Mar. 31, 2022 (JP) ................................. 2022-059178

(51) Int. Cl. 
B60Q 1/42 (2006.01)

(52) U.S. Cl. 
CPC .................................... B60Q 1/425 (2013.01)

(58) Field of Classification Search 
CPC . B60Q 1/425; B60Q 1/46; B60Q 1/343; B62J 6/056; B62J 6/16; B62K 11/14 
USPC ....................................................... 116/35 A 
See application file for complete search history.

(56) References Cited

U.S. PATENT DOCUMENTS

| | | | | |
|---|---|---|---|---|
| 4,191,866 A | * | 3/1980 | Nakajima | ............... B62K 11/14 |
| | | | | 200/4 |
| 4,216,459 A | | 8/1980 | Harata et al. | |
| 5,739,751 A | | 4/1998 | Ishihara et al. | |
| 2008/0164991 A1 | * | 7/2008 | Shimizu | ................... B60Q 1/40 |
| | | | | 340/476 |
| 2015/0287555 A1 | * | 10/2015 | Inose | ....................... H01H 9/02 |
| | | | | 200/4 |

FOREIGN PATENT DOCUMENTS

| | | | | |
|---|---|---|---|---|
| CN | 101083179 A | * | 12/2007 | ............... B60Q 1/40 |
| DE | 102015012770 A1 | * | 4/2016 | ............... B62J 6/057 |
| JP | 58-26196 Y2 | | 6/1983 | |
| JP | H08253073 A | | 10/1996 | |
| JP | 2010179672 A | * | 8/2010 | |
| JP | 5474362 B2 | | 4/2014 | |
| JP | 2015210845 A | * | 11/2015 | |

* cited by examiner

*Primary Examiner* — Kristina M Deherrera 
*Assistant Examiner* — Evan Mancini 
(74) *Attorney, Agent, or Firm* — Keating & Bennett, LLP

(57) ABSTRACT

A turn signal switch device that can immediately execute a function different from blinking of a turn signal, and prevent an erroneous operation. The turn signal switch device includes an operation knob configured to be swing-operable along an extending direction of a handlebar, and operable in a direction vertical to the swing direction and extending toward an upper side of a vehicle, in which, if the operation knob is operated in the rising direction, the turn signal executes a lighting mode different from blinking of the turn signal that is performed by the swing operation, and after the operation knob is operated in the swing direction, tor the rising direction, the operation knob returns to a neutral position at which the operation knob is held at a non-operated timing of the operation knob.

7 Claims, 11 Drawing Sheets

TURN SIGNAL SWITCH DEVICE

BACKGROUND OF THE INVENTION

Field of the Invention

The present invention relates to a turn signal switch device, and particularly to a turn signal switch device that can also execute a function other than blinking of a turn signal.

Description of the Related Art

A turn signal switch is arranged in a switch housing mounted to a handlebar of a vehicle. The turn signal switch normally includes an operation knob swing-operable substantially parallel to an extending direction of the handlebar, and blinks a turn signal of the vehicle on a side corresponding to an operation direction, in accordance with a swing operation of the operation knob that is performed by a finger of a driver. In addition, the operation knob is also configured to be push-operable, and cancels the blinking of the turn signal in accordance with the push operation.

Meanwhile, also in a two-wheel vehicle or the like, there has been an increasing demand for the installation of a hazard switch for executing a hazard function of simultaneously blinking turn signals on both sides of a vehicle, and the hazard switch is sometimes newly installed into the switch housing. On the other hand, in response to recent needs for downsizing and weight saving, the switch housing has also been downsized. In addition, a switch for operation mode switching and a switch for turning on/off traction control are also required to be arranged in the switch housing. Accordingly, it is difficult to ensure an installation location of the hazard switch in the switch housing.

In view of the foregoing, there has been proposed allocating an on/off operation of the hazard function to an operation of an operation knob of a turn signal switch instead of installing the hazard switch into the switch housing (for example, refer to Japanese Patent No. 5474362).

Nevertheless, in the technique proposed in Japanese Patent No. 5474362, because a plurality of push operations of the operation knob or a continual push operation of the operation knob performed over a predetermined time is set as an on/off operation of the hazard function, a certain period of time is required to execute the hazard function, and when a driver desired to immediately execute the hazard function, the demand cannot be met, which has been problematic.

In addition, as another problem, an erroneous operation easily occurs because both of the on/off operation of the hazard function and the cancel of blinking of the turn signal are implemented by a push operation of the operation knob.

SUMMARY OF THE INVENTION

The present invention provides a turn signal switch device that can immediately execute a function different from blinking of a turn signal, and prevent an erroneous operation.

Accordingly, an aspect of the present invention provides a turn signal switch device including an operation knob configured to be swing-operable along a first operation direction, operable in a push direction, and operable in a second operation direction different from both of the first operation direction and the push direction, in which, if a swing operation of the operation knob is performed, a turn signal on a side corresponding to a direction of the swing operation blinks, if the operation knob is operated in the second operation direction, the turn signal executes a lighting mode different from blinking of the turn signal that is performed by the swing operation, and after the operation knob is operated in the first operation direction, the push direction, or the second operation direction, the operation knob returns to a neutral position at which the operation knob is held at a non-operated timing of the operation knob.

According to the present invention, if the operation knob is operated in the second operation direction, the turn signal executes the lighting mode different from blinking of the turn signal that is performed by the swing operation of the operation knob. Thus, a driver can immediately execute the lighting mode of the turn signal that is different from blinking of the turn signal that is performed by the swing operation of the operation knob, only by operating the operation knob in the second operation direction without push-operating the operation knob a plurality of times, or continually push-operating the operation knob over a predetermined time. In addition, if the operation knob is operated in the second operation direction different from both of the first operation direction and the push direction, the lighting mode of the turn signal that is different from blinking of the turn signal that is performed by the swing operation of the operation knob is executed. Thus, it is possible to prevent an erroneous operation of performing blinking of the turn signal or cancelling the blinking, with intent to execute the function different from blinking of the turn signal.

Further features of the present invention will become apparent from the following description of exemplary embodiments with reference to the attached drawings.

BRIEF DESCRIPTION OF THE DRAWINGS

FIGS. 9A to 9C are views of a front housing of the switch housing that is viewed from a vehicle rear side;

DESCRIPTION OF THE EMBODIMENTS

Hereinafter, an embodiment of the present invention will be described in detail with reference to the drawings.

Figure 1A:
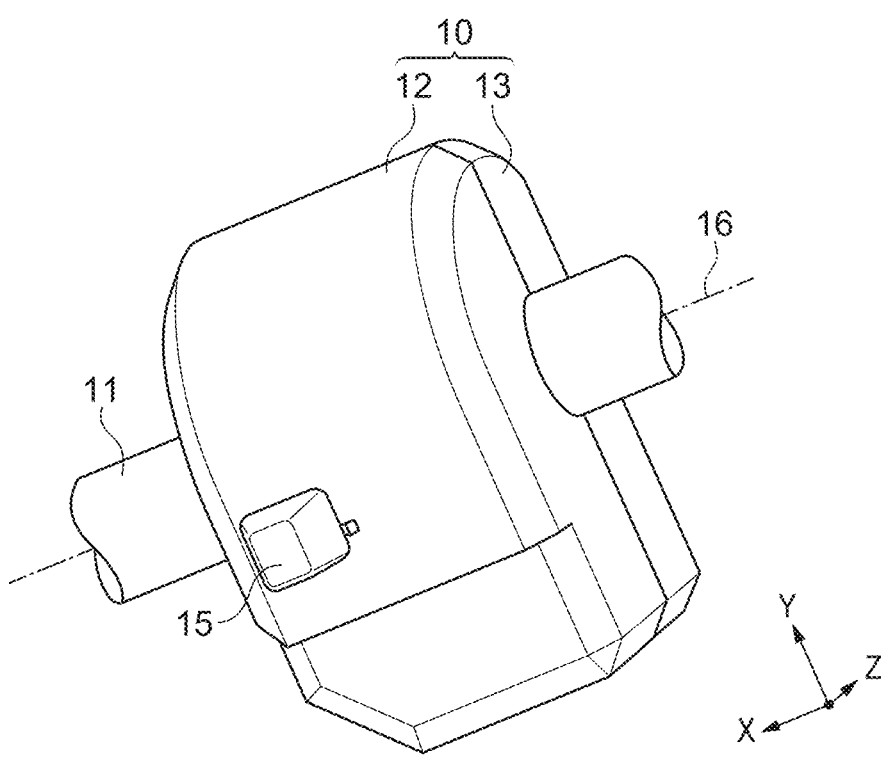
FIGS. 1A and 1B are perspective views schematically showing a configuration of a switch housing in which a turn signal switch device according to an embodiment of the present invention is arranged.
Figure 1B:
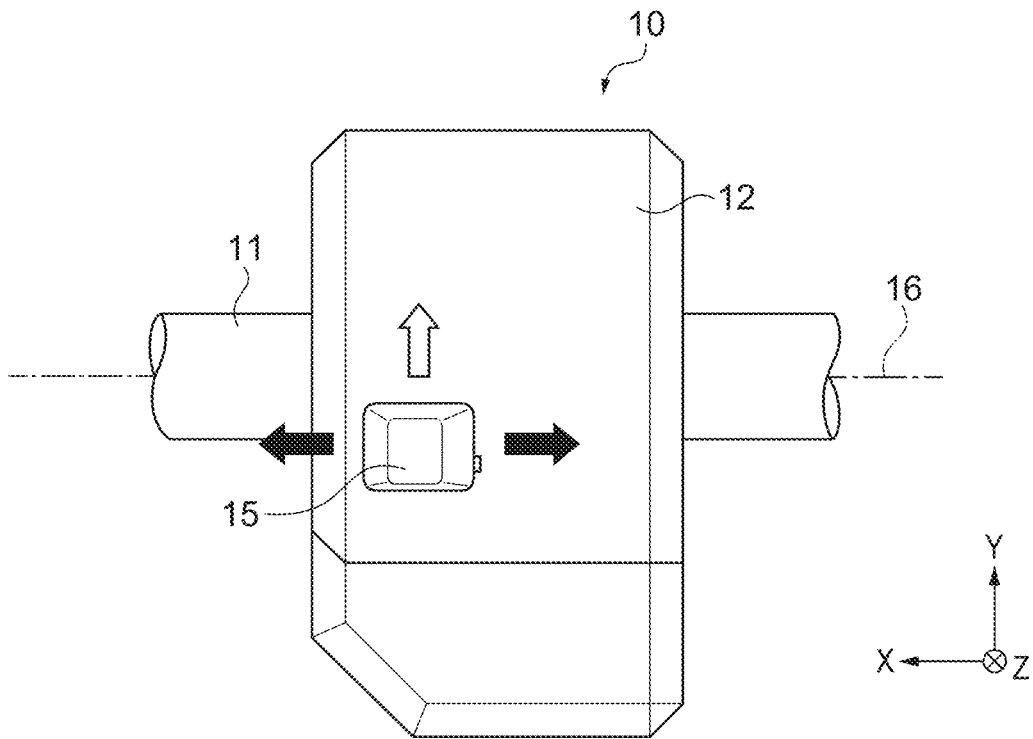

FIGS. 1A and 1B are perspective views schematically showing a configuration of a switch housing being a part of a turn signal switch device according to an embodiment of the present invention. It should be noted that, in FIGS. 1A and 1B to 5, 9A to 9C, and 10 to be described below, an X direction in the drawings indicates a direction extending along an axis line of a handlebar 11, and a Y direction in the drawings is orthogonal to the X direction. It should be noted that, in the present embodiment, the Y direction indicates an up-down direction of a vehicle including the handlebar 11. In addition, a Z direction in the drawings is a direction orthogonal to the X direction and the Y direction, and in the present embodiment, corresponds to a front-back direction of the vehicle.

In FIG. 1A, a switch housing 10 having a case shape includes a front housing 12 arranged on a driver side in a traveling direction of the vehicle, and a rear housing 13 arranged on an opposite side of a driver in the traveling direction of the vehicle. By being fastened to each other by a screw (not shown), the front housing 12 and the rear housing 13 sandwich the handlebar 11 of a vehicle (not shown) such as a two-wheel vehicle, and are fixed to the handlebar 11. In addition, an operation knob 15 of a turn signal switch device 14 protrudes from the front housing 12 toward a vehicle rear side. It should be noted that the switch housing 10 may be a constituent element of the turn signal switch device 14, and in this case, it can also be said that the operation knob 15 is mounted on the switch housing 10.

The operation knob 15 is configured to be swing-operable along an extending direction of the handlebar 11 (hereinafter, referred to as a "swing direction".) (first operation direction), and push-operable toward the vehicle front side. In addition, the operation knob 15 is configured to be operable in a direction (hereinafter, referred to as a "rising direction".) (second operation direction) that is vertical to the swing direction and extending toward the upper side of the vehicle, which is different from the swing direction and a push direction of the operation knob 15 (FIG. 1B). It should be noted that the rising direction of the operation knob 15 does not exactly match the up-down direction of the vehicle, but an operation in the rising direction will be hereinafter referred to as a "rising operation". In addition, the operation knob 15 is located inferior to a central axis 16 of the handlebar 11, and if the operation knob 15 is rising-operated, the operation knob 15 gets closer to the central axis 16 of the handlebar 11.

It should be noted that, in the following drawings, an operation in the swing direction of the operation knob 15 is indicated by a black filled arrow, a push operation of the operation knob 15 is indicated by a hatched arrow, and a rising operation of the operation knob 15 is indicated by a white arrow.

Figure 2:
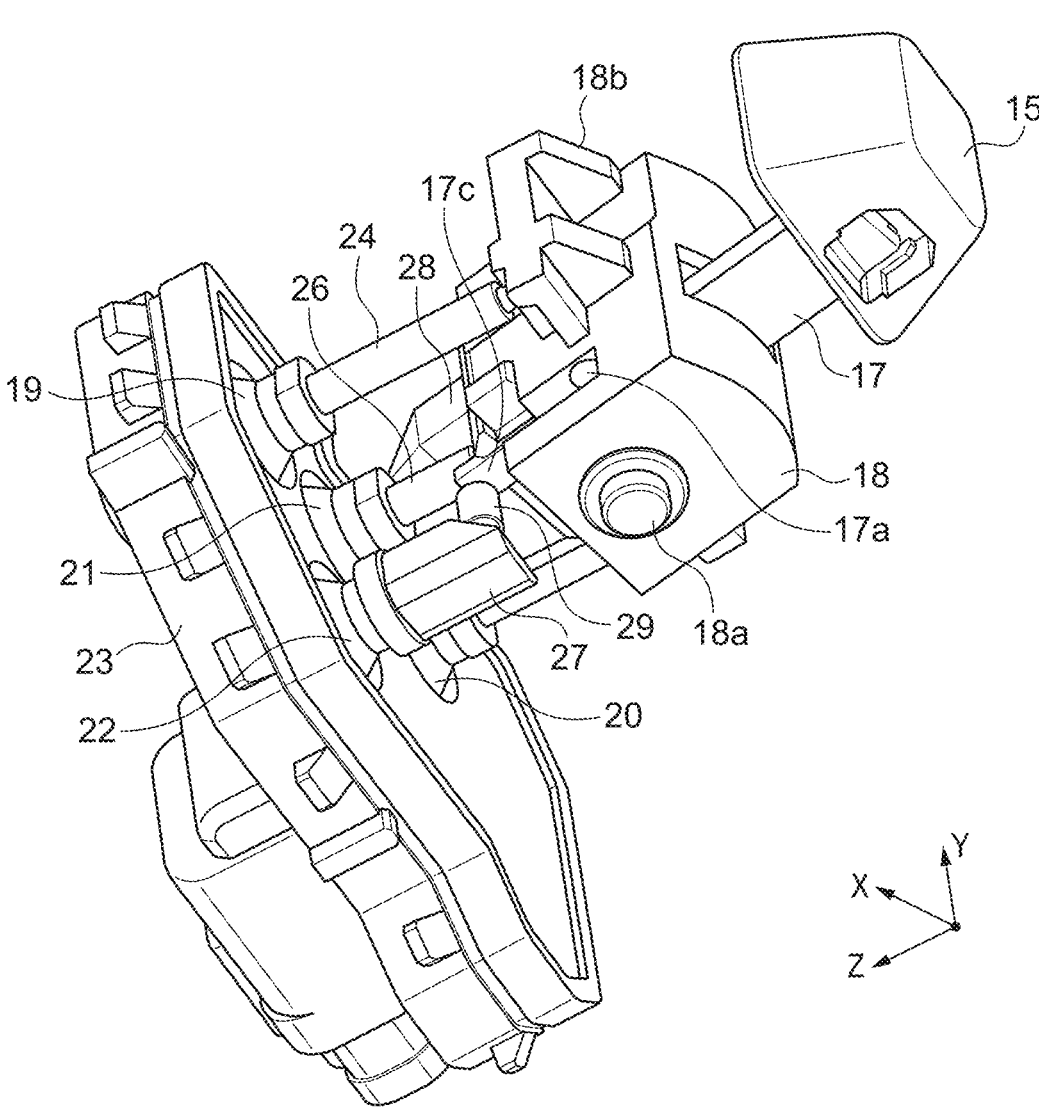
FIG. 2 is a perspective view schematically showing a configuration of the turn signal switch device according to an embodiment of the present invention.
Figure 3:
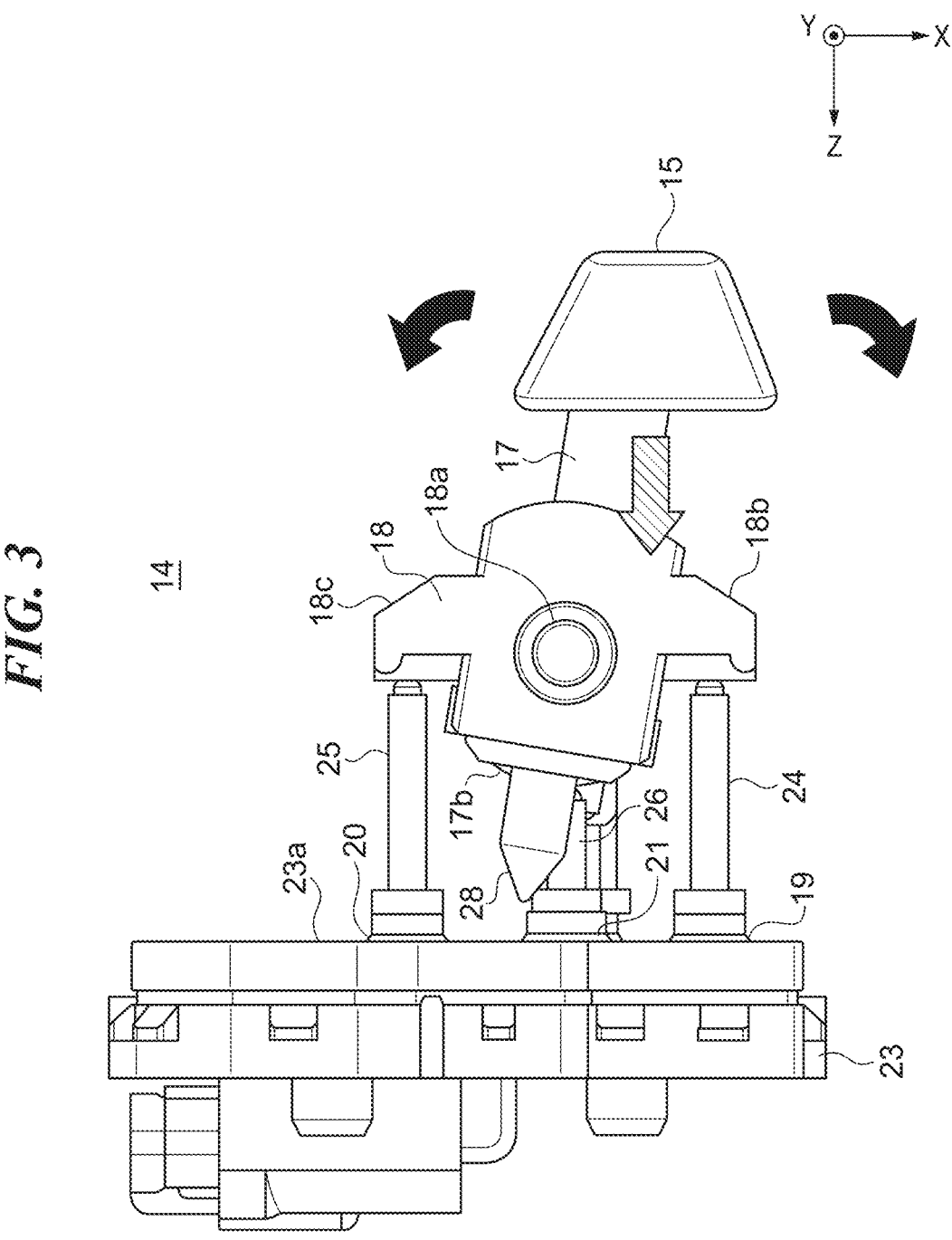
FIG. 3 is a plan view schematically showing a configuration of the turn signal switch device.
Figure 4:
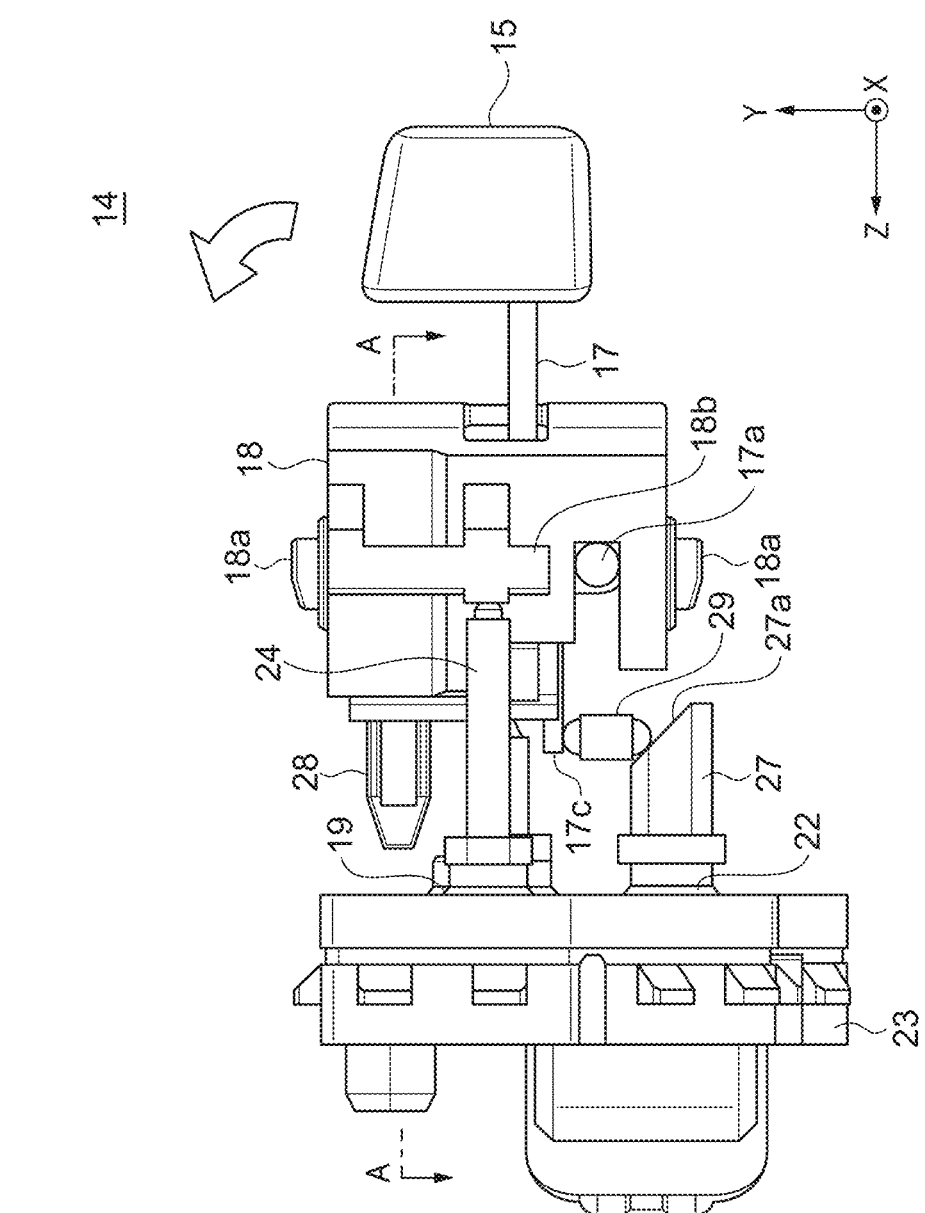
FIG. 4 is a side view schematically showing a configuration of the turn signal switch device.

FIG. 2 is a perspective view schematically showing a configuration of the turn signal switch device 14 according to an embodiment of the present invention, FIG. 3 is a plan view schematically showing a configuration of the turn signal switch device 14, and FIG. 4 is a side view schematically showing a configuration of the turn signal switch device 14. The turn signal switch device 14 is surrounded by the switch housing 10 by being sandwiched by the front housing 12 and the rear housing 13, but the illustration of the switch housing 10 is omitted in FIGS. 2 to 4.

In FIGS. 2 to 4, the turn signal switch device 14 includes the operation knob 15, a slide portion 17 mounted on the operation knob 15, and a holder 18 holding the slide portion 17. Furthermore, the turn signal switch device 14 includes a circuit board 23 including four contact point switches 19 to 22, and four pushrods 24 to 27 corresponding to the respective contact point switches 19 to 22. It should be noted that the slide portion 17, the holder 18, and the pushrods 24 to 27 will be sometimes collectively referred to as an actuator. The actuator in the present embodiment transmits an operation input to the operation knob 15, to the contact point switches 19 to 22.

The holder 18 slidably holds the slide portion 17 in the Z direction (vehicle front side). In addition, the holder 18 includes a cylindrical rotational shaft 18a protruding substantially parallel to the Y direction, and is held by the switch housing 10 in such a manner as to be rotatable around the rotational shaft 18a. It should be noted that the holder 18 does not move toward the vehicle front side.

In addition, the slide portion 17 includes a cylindrical rotational shaft 17a protruding in the X direction, and is held by the holder 18 in such a manner as to be rotatable around the rotational shaft 17a. On the other hand, if the operation knob 15 is swing-operated as described later, the slide portion 17 and the holder 18 swing together as described later.

Figure 11:
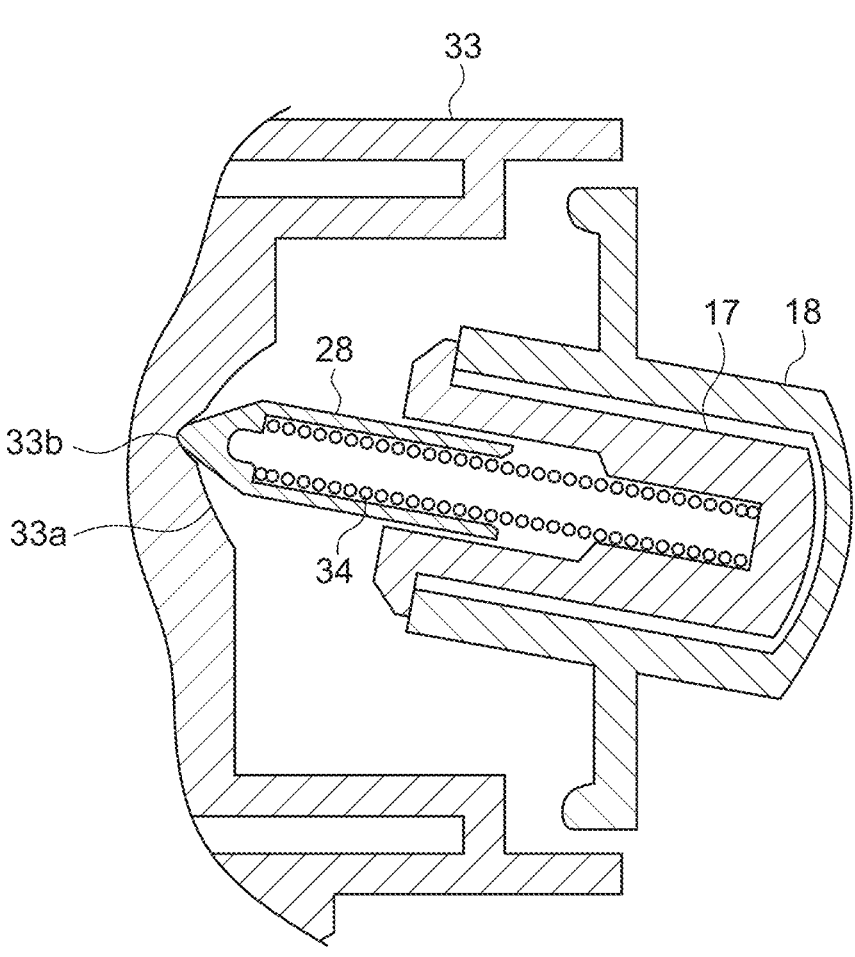
FIG. 11 is a cross-sectional view taken along a line A-A in FIG. 4.

Furthermore, as shown in FIG. 11, in the turn signal switch device 14, a case 33 is interposed between the holder 18 and the circuit board 23, and the case 33 is fixed to the switch housing 10. In addition, an urging rod 28 protruding toward a front direction of the vehicle is provided between the holder 18 and the case 33. It should be noted that the slide portion 17 is interposed between the holder 18 and the urging rod 28. In addition, in FIGS. 2 to 4, for ease of understanding, the illustration of the case 33 is omitted.

The urging rod 28 includes a spring 34 thereinside, and an end on the vehicle front side of the urging rod 28 abuts a sliding surface 33a of the case 33. The sliding surface 33a is a cross-section hemispherical concave surface recessed toward the vehicle front side, and includes a neutral recessed portion 33b into which the leading end of the urging rod 28 fits when the operation knob 15 is located at a neutral position to be described later. In addition, the contact point switches 19 to 22 are formed by so-called rubber contact switches.

As described later, if the spring 34 of the urging rod 28 or each of the contact point switches 19 to 22 is compressed when a swing operation or a push operation of the operation knob 15 is performed, urging force pushing the operation knob 15 back toward the vehicle rear side together with the holder 18 is generated by restoring force of the spring 34 or each of the contact point switches 19 to 22. If the swing operation or the push operation of the operation knob 15 that has been performed by a driver is cancelled, by the urging force, the operation knob 15 moves toward the vehicle rear side, and returns to a position set before the swing operation or the push operation has been performed.

Specifically, if a push operation of the operation knob 15 is performed, the slide portion 17 slides toward the vehicle front side, and not only the spring 34 of the urging rod 28 but also the contact point switch 21 are compressed, and the urging rod 28 and the contact point switch 21 generate urging force. On the other hand, the holder 18 does not move toward the vehicle front side, and not swing, either. Thus, the contact point switches 20 and 21 are not compressed, and do not generate urging force. Then, the rotational shaft 18a of the holder 18 exists on an action direction of urging force of the contact point switch 21 of the urging rod 28. On the other hand, because urging force of the contact point switches 20 and 21, of which the action direction is offset from the rotational shaft 18a, is not generated, moment around the rotational shaft 18*a* is not generated. Consequently, the holder 18 is pushed back as-is toward the vehicle rear side without rotating around the rotational shaft 18*a*, and the operation knob returns to a position set before the push operation, together with the holder 18.

On the other hand, if a swing operation of the operation knob 15 is performed, out of the contact point switches 19 and 20, only a contact point switch existing on the side corresponding to the direction of the swing operation is compressed by the swing of the holder 18. Thus, only the contact point switch generates urging force. When the swing operation of the operation knob 15 is cancelled, the urging force generates moment around the rotational shaft 18*a*, and rotates the holder 18 around the rotational shaft 18*a*. Then, if the leading end of the urging rod 28 rotating together with the holder 18 fits into the neutral recessed portion 33*b* of the sliding surface 33*a*, the rotation of the holder 18 stops, and the operation knob 15 returns to the neutral position. In the present embodiment, such return to a position set before a push operation of the operation knob 15, and return to the neutral position will be referred to as an auto-return function.

Figure 5:
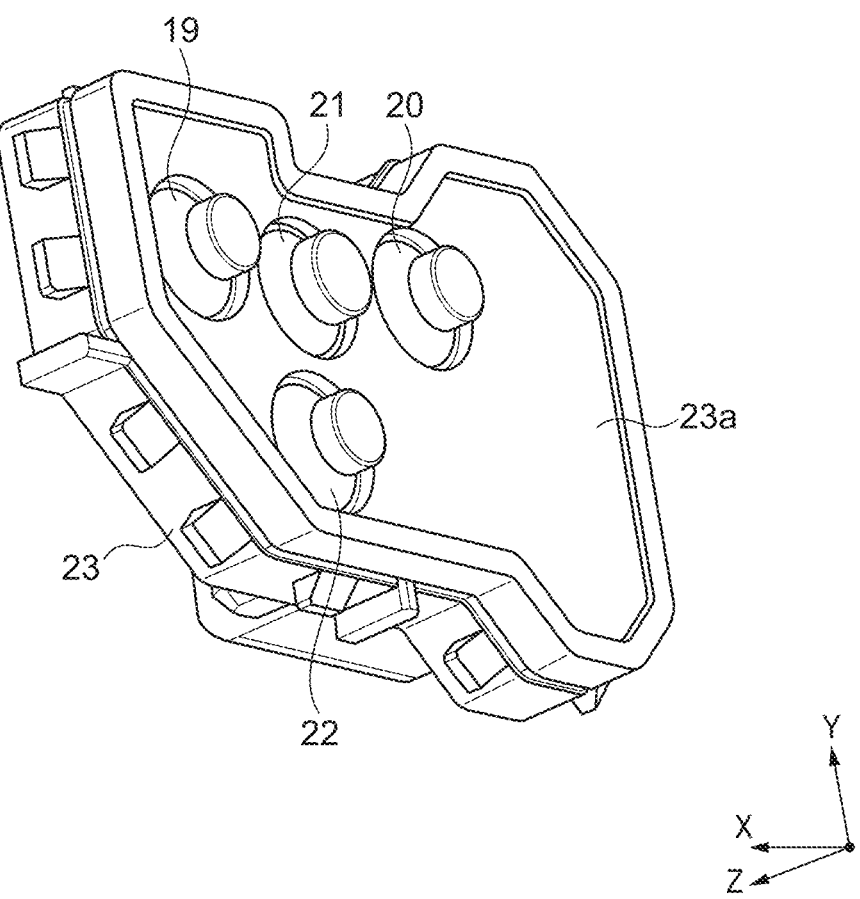
FIG. 5 is a perspective view schematically showing a configuration of a circuit board included in the turn signal switch device.

The circuit board 23 is arranged at a position closer to the vehicle front side than the slide portion 17 and the holder 18. To achieve downsizing and a reduction in the number of components, the circuit board 23 includes the four contact point switches 19 to 22 as shown in FIG. 5. The contact point switches 19 to 22 are arranged on an arrangement surface 23*a* on the vehicle rear side on the same circuit board 23 in such a manner as to face the slide portion 17 and the holder 18. It should be noted that, by forming the contact point switches 19 to 22 by microswitches, for example, the contact point switches 19 to 22 may be arranged in such a manner as not to be directed in the same direction on the arrangement surface 23*a*. Furthermore, the contact point switches 19 to 22 may be arranged on separate constituent elements of the turn signal switch device 14 or components of the switch housing 10 without being arranged on the same circuit board 23.

On the arrangement surface 23*a*, the contact point switch 19 is arranged on a vehicle left side, the contact point switch 20 is arranged on a vehicle right side of the contact point switch 19, the contact point switch 21 is arranged in such a manner as to be sandwiched between the contact point switch 19 and the contact point switch 20, and the contact point switch 22 is arranged below the contact point switch 21. The function of each of the contact point switches 19 to 22 will be described later.

The four pushrods 24 to 27 are arranged between the circuit board 23 and the slide portion 17 or the holder 18 in such a manner as to extend along the Z direction. Specifically, the pushrod 24 is arranged between the contact point switch 19 and a flange 18*b* protruding toward the left side of the holder 18. In addition, the pushrod 25 is arranged between the contact point switch 20 and a flange 18*c* protruding toward the right side of the holder 18, the pushrod 26 is arranged between the contact point switch 21 and an end 17*b* on the vehicle front side of the slide portion 17, and the pushrod 27 is arranged between the contact point switch 22 and the holder 18. Furthermore, a slope 27*a* is formed at an end on the vehicle rear side of the pushrod 27, and an intermediate rod 29 arranged in such a manner as to extend substantially parallel to the Y direction is arranged between the slope 27*a* and a flange 17*c* protruding from the slide portion 17 toward the vehicle front side. The slope 27*a* of the pushrod 27 is formed in such a manner that an upper portion thereof slopes toward the vehicle front side.

Each of the contact point switches 19 to 22 is connected to control means of the vehicle, such as an electronic control unit (ECU) (not shown), for example, and if the contact point switches 19 to 22 are pressed toward the vehicle front side by the respective pushrods 24 to 27, the contact point switches 19 to 22 each transmit a signal (hereinafter, will be referred to as a "press signal".) indicating that a corresponding contact point switch has been pressed, to the ECU. In addition, the ECU is connected with turn signals (not shown) arranged respectively on both the left and right sides of the vehicle, and controls lighting and extinction of each turn signal in accordance with a press signal transmitted from each of the contact point switches 19 to 22.

Figure 6A:
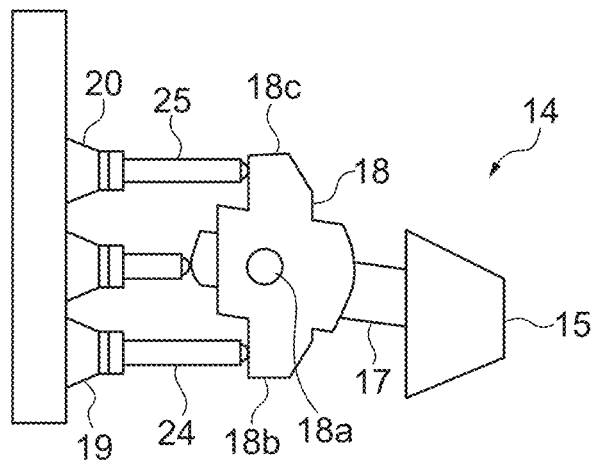
FIGS. 6A to 6C are diagrams indicating a swing operation of an operation knob.
Figure 6B:
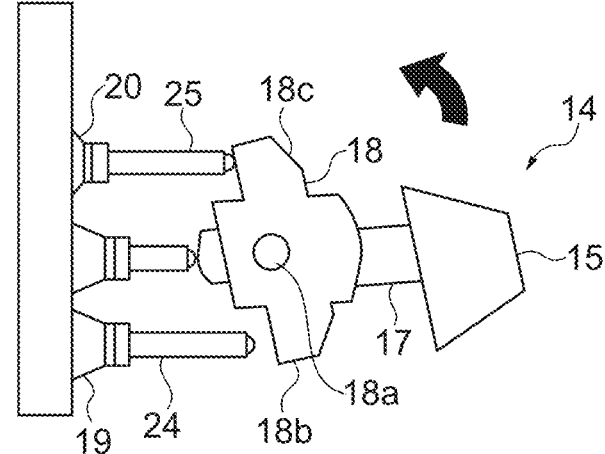
Figure 6C:
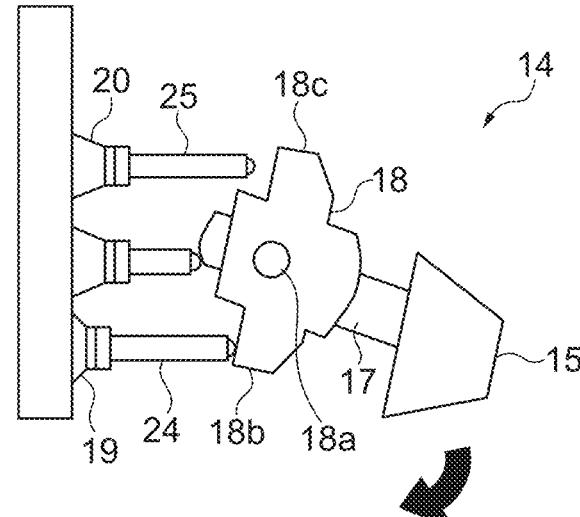

FIGS. 6A to 6C are diagrams indicating a swing operation of the operation knob 15. In FIGS. 6A to 6C, the illustration of the switch housing 10 and the handlebar 11 is omitted, and only the turn signal switch device 14 is shown. In addition, FIGS. 6A to 6C show a case where the turn signal switch device 14 is viewed from the upper side of the vehicle, and a left direction in the drawings corresponds to the front direction of the vehicle, a right direction in the drawings corresponds to the back direction of the vehicle, an upper direction in the drawings corresponds to the right direction of the vehicle, and a lower direction in the drawings corresponds to the left direction of the vehicle.

In FIGS. 6A to 6C, as described above, the holder 18 is held by the switch housing 10 in such a manner as to be rotatable around the rotational shaft 18*a*. Nevertheless, the slide portion 17 is held in such a manner as to be non-rotatable around the rotational shaft 18*a* with respect to the holder 18, and rotates around the rotational shaft 18*a* integrally with the holder 18. Then, the rotational shaft 18*a* protrudes substantially parallel to the up-down direction of the vehicle. Accordingly, the slide portion 17 and the holder 18 can swing in a left-right direction of the vehicle, and because the left-right direction of the vehicle is substantially parallel to the extending direction of the handlebar 11, the slide portion 17 and the holder 18 become swingable along the extending direction of the handlebar 11, and the operation knob 15 integrated with the slide portion 17 thereby becomes swingable in the swing direction. In addition, the turn signal switch device 14 has the above-described auto-return function of returning the operation knob 15 to the neutral position when the operation knob 15 is swing-operated in neither of the left and right directions (non-operated timing). It should be noted that the neutral position of the operation knob 15 is a position at which the operation knob 15 is held at the non-operated timing of the operation knob 15.

In the turn signal switch device 14, in a case where the operation knob 15 exists at the neutral position, because neither of the left and right flanges 18*b* and 18*c* of the holder 18 moves toward the vehicle front side, the flanges 18*b* and 18*c* do not move the respective pushrods 24 and 25 toward the vehicle front side, and neither of the pushrods 24 and 25 presses the respective contact point switches 19 and 20 (FIG. 6A).

In a case where the operation knob 15 is swing-operated in the right direction, the flange 18*c* of the holder 18 rotating around the rotational shaft 18*a* moves toward the vehicle front side, and moves the pushrod 25 toward the vehicle front side (FIG. 6B). The contact point switch 20 (first conduction portion) is thereby pressed by the pushrod 25, and transmits a press signal to the ECU. If the ECU receives the press signal from the contact point switch 20, the ECU blinks the turn signal on the right side of the vehicle.

On the other hand, in a case where the operation knob 15 is swing-operated in the left direction, the flange 18*b* of the holder 18 rotating around the rotational shaft 18*a* moves toward the vehicle front side, and moves the pushrod 24 toward the vehicle front side (FIG. 6C). The contact point switch 19 (second conduction portion) is thereby pressed by the pushrod 24, and transmits a press signal to the ECU. If the ECU receives the press signal from the contact point switch 19, the ECU blinks the turn signal on the left side of the vehicle.

That is, the operation knob 15 blinks a turn signal on a side corresponding to a direction in which the operation knob 15 is swing-operated. It should be noted that, if a swing operation in the left-right direction of the operation knob 15 is cancelled, by the above-described auto-return function, the operation knob returns to the neutral position.

Figure 7A:
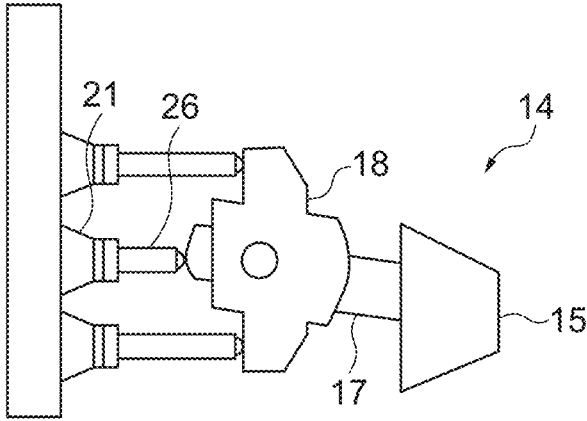
FIGS. 7A and 7B are diagrams indicating a push operation of an operation knob.
Figure 7B:
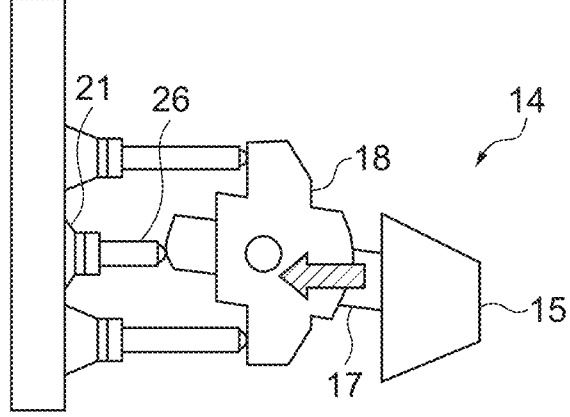

FIGS. 7A and 7B are diagrams indicating a push operation of the operation knob 15. FIGS. 7A and 7B also show a case where the turn signal switch device 14 is viewed from the upper side of the vehicle, and the up-down direction and the left-right direction in FIGS. 7A and 7B are the same as the up-down direction and the left-right direction in FIGS. 6A to 6C.

In FIGS. 7A and 7B, as described above, because the holder 18 slidably holds the slide portion 17 in the front-back direction of the vehicle, a push operation toward the vehicle front side of the operation knob 15 integrated with the slide portion 17 becomes executable.

In the turn signal switch device 14, in a case where the operation knob 15 is not push-operated toward the vehicle front side, because the slide portion 17 does not move toward the vehicle front side, the slide portion 17 does not move the pushrod 26 toward the vehicle front side, and the pushrod 26 does not press the contact point switch 21 (FIG. 7A).

In a case where the operation knob 15 is push-operated toward the vehicle front side, the slide portion 17 moves toward the vehicle front side, and moves the pushrod 26 toward the vehicle front side (FIG. 7B). The contact point switch 21 (third conduction portion) is thereby pressed by the pushrod 26, and transmits a press signal to the ECU. If the ECU receives the press signal from the contact point switch 21, the ECU cancels blinking of a turn signal of the vehicle.

In addition, if a push operation toward the vehicle front side of the operation knob 15 is cancelled, by the above-described auto-return function, the operation knob 15 returns to a position set before the push operation has been performed.

Figure 8A:
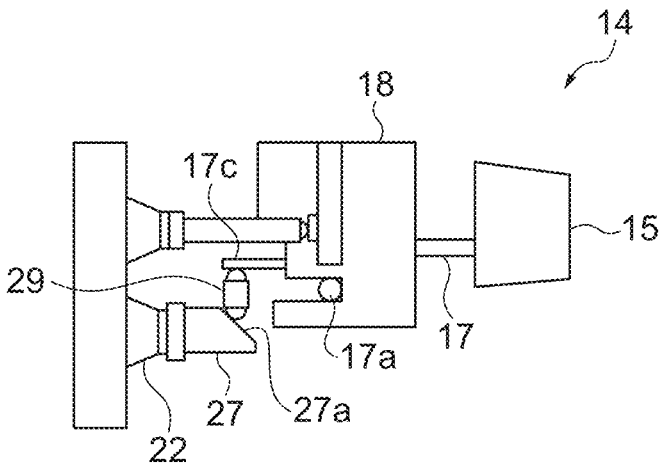
FIGS. 8A and 8B are diagrams indicating a rising operation of an operation knob.
Figure 8B:
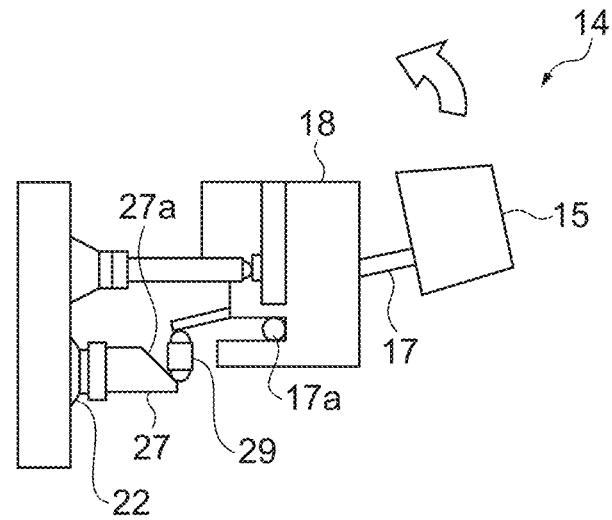

FIGS. 8A and 8B are diagrams indicating a rising operation of the operation knob 15. FIGS. 8A and 8B also show only the turn signal switch device 14, but show not a case where the turn signal switch device 14 is viewed from the upper side of the vehicle, but a case where the turn signal switch device 14 is viewed from the left side of the vehicle. In addition, in FIGS. 8A and 8B, a left direction in the drawings corresponds to the front direction of the vehicle, a right direction in the drawings corresponds to the back direction of the vehicle, an upper direction in the drawings corresponds to the upper direction of the vehicle, and a lower direction in the drawings corresponds to the lower direction of the vehicle.

In FIGS. 8A and 8B, the slide portion 17 is held by the holder 18 in such a manner as to be rotatable around the rotational shaft 17*a*. On the other hand, the holder 18 is held in such a manner as to be non-rotatable around the rotational shaft 17*a* with respect to the switch housing 10. Then, the rotational shaft 17*a* protrudes substantially parallel to the left-right direction of the vehicle. Accordingly, the slide portion 17 is swingable in the up-down direction of the vehicle, and the operation knob 15 integrated with the slide portion 17 thereby becomes swingable in the up-down direction of the vehicle. It should be noted that, if the operation knob 15 is rising-operated, the flange 17*c* of the slide portion 17 located on the opposite side (the vehicle front side) of the operation knob 15 with respect to the rotational shaft 17*a* moves toward the lower direction of the vehicle by the rotation of the slide portion 17 around the rotational shaft 17*a*.

In the turn signal switch device 14, in a case where the operation knob 15 is not rising-operated, because the slide portion 17 does not rotate around the rotational shaft 17*a*, the flange 17*c* of the slide portion 17 does not move toward the lower direction of the vehicle. Accordingly, the flange 17*c* does not move the intermediate rod 29 toward the vehicle lower side, and the intermediate rod 29 does not press the slope 27*a* of the pushrod 27 toward the vehicle lower side. Accordingly, the pushrod 27 does not move toward the vehicle front side, and the pushrod 27 does not press the contact point switch 22 (FIG. 8A).

In a case where the operation knob 15 is rising-operated, the slide portion 17 rotates around the rotational shaft 17*a*, and the flange 17*c* of the slide portion 17 moves toward the lower direction of the vehicle. Accordingly, the flange 17*c* moves the intermediate rod 29 toward the vehicle lower side, and the intermediate rod 29 presses the slope 27*a* of the pushrod 27 toward the vehicle lower side. Here, as described above, because the slope 27*a* is formed in such a manner that the upper portion slopes toward the vehicle front side, if the intermediate rod 29 presses the slope 27*a* toward the vehicle lower side, in accordance with the movement toward the vehicle lower side of the intermediate rod 29, the slope 27*a* moves toward the vehicle front side, and the pushrod 27 consequently moves toward the vehicle front side (FIG. 8B). The contact point switch 22 (fourth conduction portion) is thereby pressed by the pushrod 27, and transmits a press signal to the ECU. If the ECU receives the press signal from the contact point switch 22, the ECU executes the hazard function, and simultaneously blinks the turn signals on the both sides of the vehicle. It should be noted that the function corresponding to the pressing of the contact point switch 22 is not limited to the hazard function, and is only required to be a lighting function or a blinking function of a turn signal that is different from blinking of a turn signal corresponding to the pressing of the contact point switch 20 or the contact point switch 19.

In addition, if a rising operation of the operation knob 15 is cancelled, urging force of the contact point switch 22 compressed by pressing generates moment around the rotational shaft 17*a*, and rotates the slide portion 17 around the rotational shaft 17*a*. The operation knob 15 accordingly moves toward the vehicle lower side, and returns to a position set before the rising operation has been performed. It should be noted that the flange 17*c* of the slide portion 17 of the turn signal switch device 14, the slope 27*a* of the pushrod 27, and the intermediate rod 29 constitute a conversion mechanism that converts a rising operation of the operation knob 15 into a movement toward the vehicle front side of the pushrod 27 (movement parallel to the push direction).

Figure 9A:
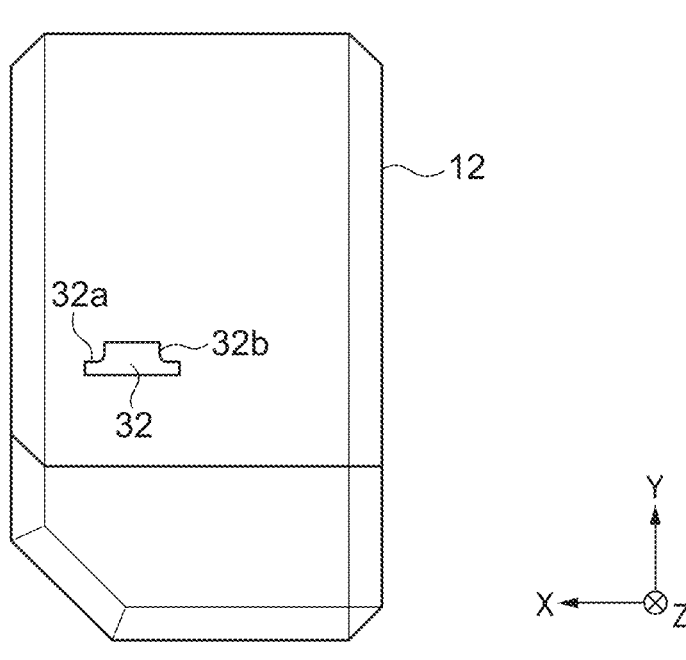
Figure 9A:
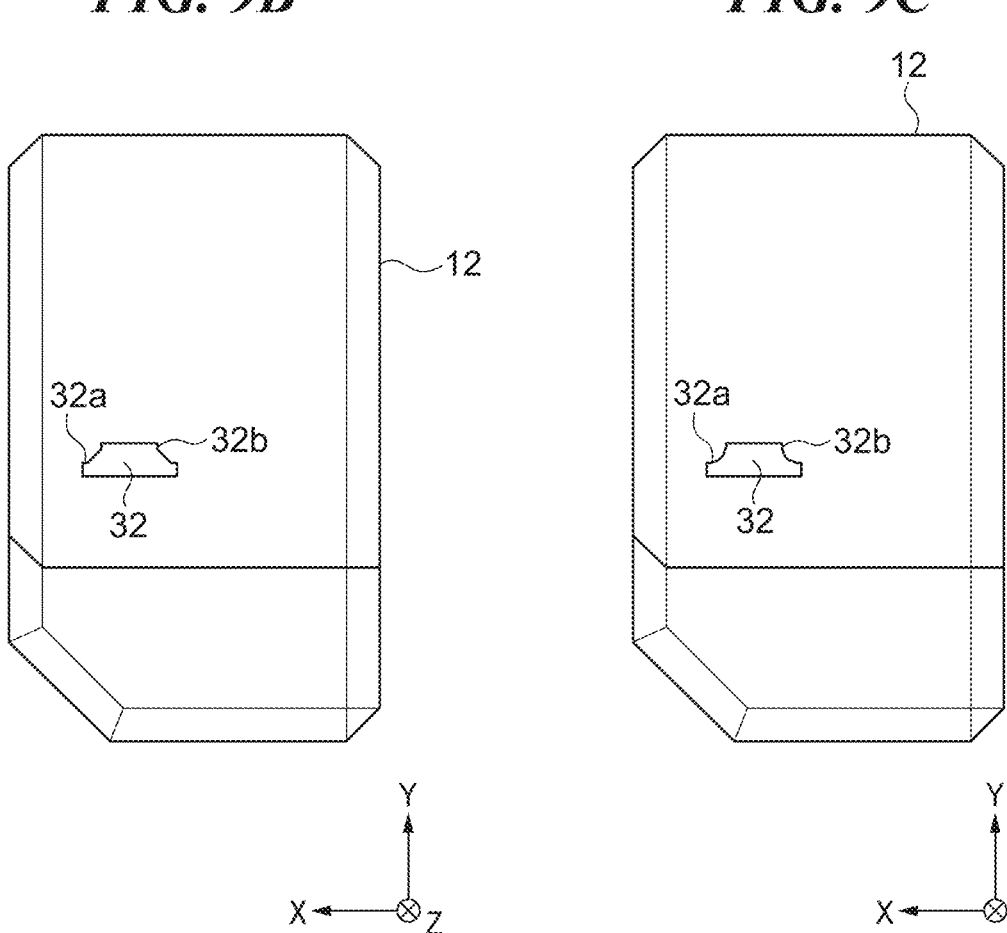

FIGS. 9A to 9C are views of the front housing 12 of the switch housing 10 that is viewed from the vehicle rear side. The front housing 12 includes a through-hole 32 for causing the slide portion 17 of the turn signal switch device 14 built in the switch housing 10, to protrude toward the vehicle rear side, in its wall portion on the vehicle rear side, and the slide portion 17 is inserted into the through-hole 32 and protrudes toward the outside of the switch housing 10 (vehicle rear side). It should be noted that the operation knob 15 is provided at an end on the vehicle rear side of the slide portion 17. The through-hole 32 includes a swing opening portion 32a (first opening portion) opening along the swing direction, and a rising opening portion 32b (second opening portion) opening along a direction vertical to the swing direction, and the swing opening portion 32a and the rising opening portion 32b are arranged in such a manner as to intersect with each other (FIG. 9A).

As described above, the turn signal switch device 14 has a configuration in which the operation knob is swingable in the swing direction. When the operation knob 15 swings in the swing direction, the operation knob 15 is guided by the swing opening portion 32a.

In addition, the turn signal switch device 14 has a configuration in which the operation knob 15 is swingable in the up-down direction of the vehicle. When the operation knob 15 swings in the up-down direction of the vehicle, the operation knob 15 is guided by the rising opening portion 32b. Here, the rising opening portion 32b is formed only at a position superior to the swing opening portion 32a, and is not formed at a position inferior to the swing opening portion 32a. Accordingly, when the operation knob 15 is operated in a direction vertical to the swing direction, the operation knob 15 cannot move toward the lower side of the vehicle, and can move only toward the upper side of the vehicle. With this configuration, the operation knob 15 is allowed to be only rising-operated with respect to the up-down direction of the vehicle.

Furthermore, the rising opening portion 32b intersects with the swing opening portion 32a at a point at which the operation knob 15 exists at the neutral position. Accordingly, the operation knob 15 is allowed to be rising-operated only in a case where the operation knob 15 exists at the neutral position with respect to the swing direction.

In addition, a connection point of the swing opening portion 32a and the rising opening portion 32b may be formed into a round shape (FIG. 9C) in such a manner that an operation of the operation knob 15 can smoothly shift from an operation in the swing direction to a rising operation, or a connection point of the swing opening portion 32a and the rising opening portion 32b may be formed in such a manner as to form an oblique side (FIG. 9B).

According to the present embodiment, in the turn signal switch device 14, the operation knob 15 is configured to be operable in the rising direction, which is different from the swing direction and the push direction of the operation knob 15. If the operation knob 15 is operated in the rising direction, the hazard function, which is a function different from blinking of a turn signal, is executed. Thus, a driver can immediately execute the hazard function only by operating the operation knob 15 in the rising direction without push-operating the operation knob 15a plurality of times, or continually push-operating the operation knob over a predetermined time.

In addition, if the operation knob 15 is operated in the rising direction different from both of the swing direction and the push direction, the hazard function is executed. Thus, it is possible to prevent an erroneous operation of performing blinking of a turn signal or cancelling the blinking, with intent to execute the hazard function.

Meanwhile, because the operation knob 15 is located inferior to the central axis 16 of the handlebar 11, when a driver swing-operates the operation knob 15 along the swing direction with a finger of a hand gripping the handlebar 11, the driver might carelessly apply downward load on the operation knob 15.

Nevertheless, in the present embodiment, as described above, the operation knob 15 is not allowed to move toward the lower side of the vehicle, and to execute the hazard function, it is necessary to rising-operate the operation knob 15 in such a manner as to bring the operation knob 15 closer to the handlebar 11. Thus, it is also possible to prevent an erroneous operation of erroneously executing the hazard function when the driver swing-operates the operation knob 15 to blink a turn signal.

Heretofore, a preferable embodiment of the present invention has been described, but the present invention is not limited to the above-described embodiment, and various variations and modifications can be made without departing from the gist thereof.

Figure 10:
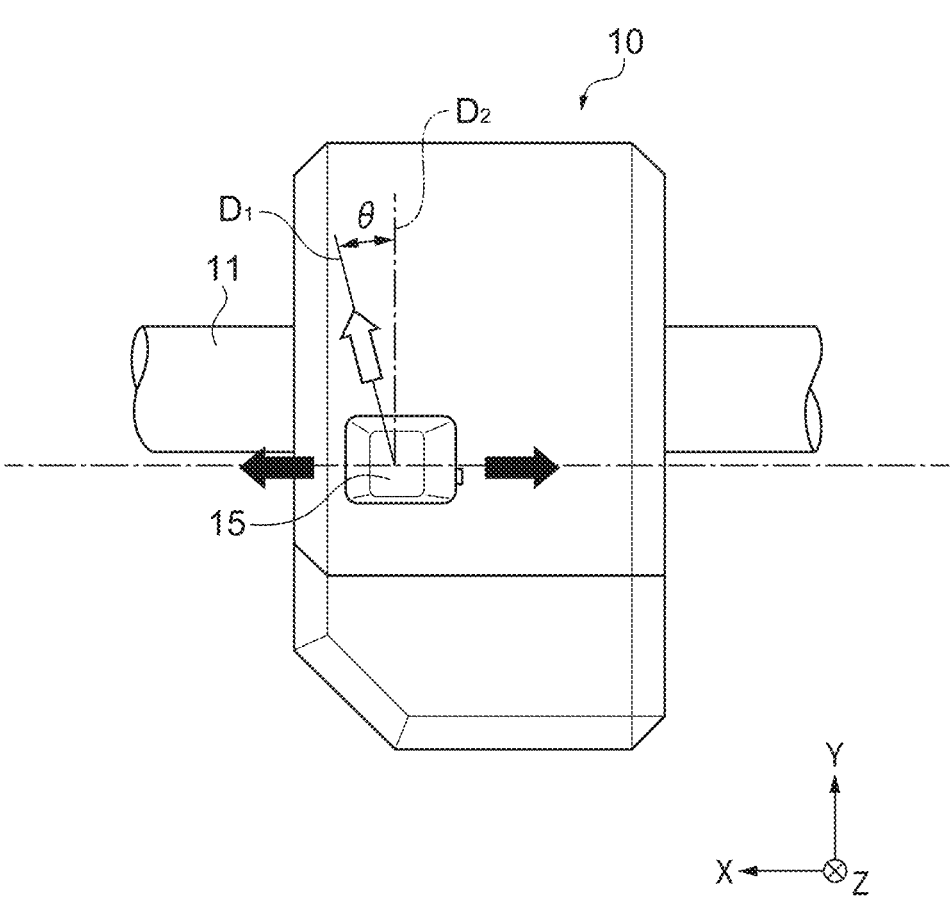
FIG. 10 is a view indicating a variation of an operation direction of an operation knob.

For example, the rising direction of the operation knob 15 is vertical to the swing direction, but the rising direction of the operation knob 15 needs not always be vertical to the swing direction, and is only required to be a direction extending toward the upper side of the vehicle, and a direction different from the swing direction. For example, as shown in FIG. 10, a rising direction $D_1$ of the operation knob 15 that is indicated by a solid line may incline by a predetermined angle $\theta$ with respect to a direction $D_2$ vertical to the swing direction, and the predetermined angle $\theta$ is 5° or more, for example. In this case, from the perspective of operability improvement of the operation knob 15, the rising direction $D_1$ preferably inclines in such a manner as to get closer to a hand of a driver gripping the handlebar 11, with respect to the vertical direction $D_2$ vertical to the swing direction.

In addition, in the present embodiment, if the operation knob 15 is operated in the rising direction different from the swing direction and the push direction, the hazard function is executed, but the function to be executed when the operation knob 15 is operated in the rising direction is not limited to the hazard function. For example, the function may be a dimmer function of changing the direction of an optical axis of a headlight of a vehicle.

Furthermore, a vehicle to which the present invention is applied is not limited to a two-wheel vehicle, and the present invention can also be applied to a saddle riding type vehicle other than the two-wheel vehicle. It should be noted that the saddle riding type vehicles include all vehicles on which riders ride by straddling over vehicle bodies, and are vehicles including not only a two-wheel vehicle (including motorcycle and motorized bicycle), but also a three-wheel vehicle and a four-wheel vehicle classified into all-terrain vehicles (ATVs). In addition, the application of the present invention is not limited to vehicles, and the present invention can also be applied to a ride including a handlebar. For example, the present invention can also be applied to a snowmobile and a ship.

This application claims the benefit of Japanese Patent Application No. 2022-59178 filed on Mar. 31, 2022, which is hereby incorporated by reference herein in its entirety.

What is claimed is:

1. A turn signal switch device comprising:
a switch housing mountable on a handlebar of a vehicle;
an operation knob configured to be swing-operable along a first operation direction, operable in a push direction, and operable in a second operation direction different from both of the first operation direction and the push direction, wherein the operation knob protrudes from the switch housing, the second operation direction is a direction extending from the operation knob toward the handlebar when the switch housing is mounted on the handlebar, a through-hole is provided in a wall portion of the switch housing, the operation knob includes an actuator extending from the operation knob and inserted into the through-hole, the through-hole includes a first opening portion opening along the first operation direction, and a second opening portion opening along the second operation direction, the first opening portion and the second opening portion intersecting with each other, a connection point of the first opening portion and the second opening portion is formed into a round shape, when a swing operation of the operation knob is performed, a turn signal on a side corresponding to a direction of the swing operation blinks, when the operation knob is operated in the second operation direction, the turn signal executes a lighting mode different from blinking of the turn signal that is performed by the swing operation, and after the operation knob is operated in the first operation direction, the push direction, or the second operation direction, the operation knob returns to a neutral position at which the operation knob is held at a non-operated timing of the operation knob.

2. The turn signal switch device according to claim 1, wherein the second operation direction is a direction vertical to the first operation direction.

3. The turn signal switch device according to claim 1, wherein, when the operation knob exists at the neutral position with respect to the first operation direction, an operation in the second operation direction of the operation knob becomes executable.

4. The turn signal switch device according to claim 1, wherein a connection point of the first opening portion and the second opening portion is formed in such a manner as to form an oblique side.

5. The turn signal switch device according to claim 1, wherein a function different from blinking of the turn signal is a hazard function of simultaneously blinking the turn signals on both sides of a vehicle.

6. The turn signal switch device according to claim 1, further comprising:

a first conduction portion to be pressed when the turn signal on a right side of a vehicle is blinked;

a second conduction portion to be pressed when the turn signal on a left side of the vehicle is blinked;

a third conduction portion to be pressed when blinking of the turn signal is cancelled; and a fourth conduction portion required to be pressed when a lighting mode different from blinking of the turn signal that is performed by the swing operation is executed, wherein when the operation knob is swing-operated toward the right side of the vehicle along the first operation direction, the first conduction portion is pressed, when the operation knob is swing-operated toward the left side of the vehicle along the first operation direction, the second conduction portion is pressed, when the operation knob is push-operated, the third conduction portion is pressed, and when the operation knob is operated in the second operation direction, the fourth conduction portion is pressed.

7. The turn signal switch device according to claim 6, further comprising:

a conversion mechanism configured to convert an operation input in the second operation direction into an input in the push direction, wherein the first conduction portion, the second conduction portion, the third conduction portion, and the fourth conduction portion are provided on a same board.

* * * * *